United States Patent

Kanaizuka et al.

[11] Patent Number: 5,631,041
[45] Date of Patent: May 20, 1997

[54] MANUFACTURING METHOD FOR MAGNETIC DISC

[75] Inventors: Tadahito Kanaizuka; Atsushi Kawamoto; Koichi Yamagishi; Shinichi Yasuda; Yasunori Yamanobe; Shinichi Hayashi, all of Ichikawa, Japan

[73] Assignee: Sumitomo Metal Mining Co., Ltd., Tokyo, Japan

[21] Appl. No.: 653,107

[22] Filed: May 24, 1996

Related U.S. Application Data

[63] Continuation of Ser. No. 191,543, Feb. 4, 1994, abandoned.

[30] Foreign Application Priority Data

Sep. 27, 1993 [JP] Japan .................... 5-239541
Dec. 6, 1993 [JP] Japan .................... 5-339675

[51] Int. Cl.⁶ .................................................. B05D 5/12
[52] U.S. Cl. .................... 427/130; 427/131; 427/521; 427/557; 428/65.4; 428/65.5; 428/65.8

[58] Field of Search .................... 427/128–32, 521, 427/557; 428/66, 65.8, 65.4, 65.5

[56] References Cited

U.S. PATENT DOCUMENTS 4,188,434  2/1980  Loran .................... 427/131
4,557,947  12/1985  Deimling et al. .................... 427/130

*Primary Examiner*—Bernard Pianalto
*Attorney, Agent, or Firm*—Watson Cole Stevens Davis, P.L.L.C.

[57] ABSTRACT

A magnetic disc manufacturing apparatus is includes a polishing device for conducting a surface polishing treatment on a disc, a supply device for supplying lubricant onto the polished disc, and a feeding mechanism for feeding the disc between the devices. If necessary, it is provided with a curing device for curing the lubricant on the disc. The treatments of the devices and the disc feeding operation are synchronized with one another, and a disc processed in each device is fed to a next device at a constant time interval by the feeding mechanism, thereby performing a continuous disc manufacturing process.

13 Claims, 1 Drawing Sheet

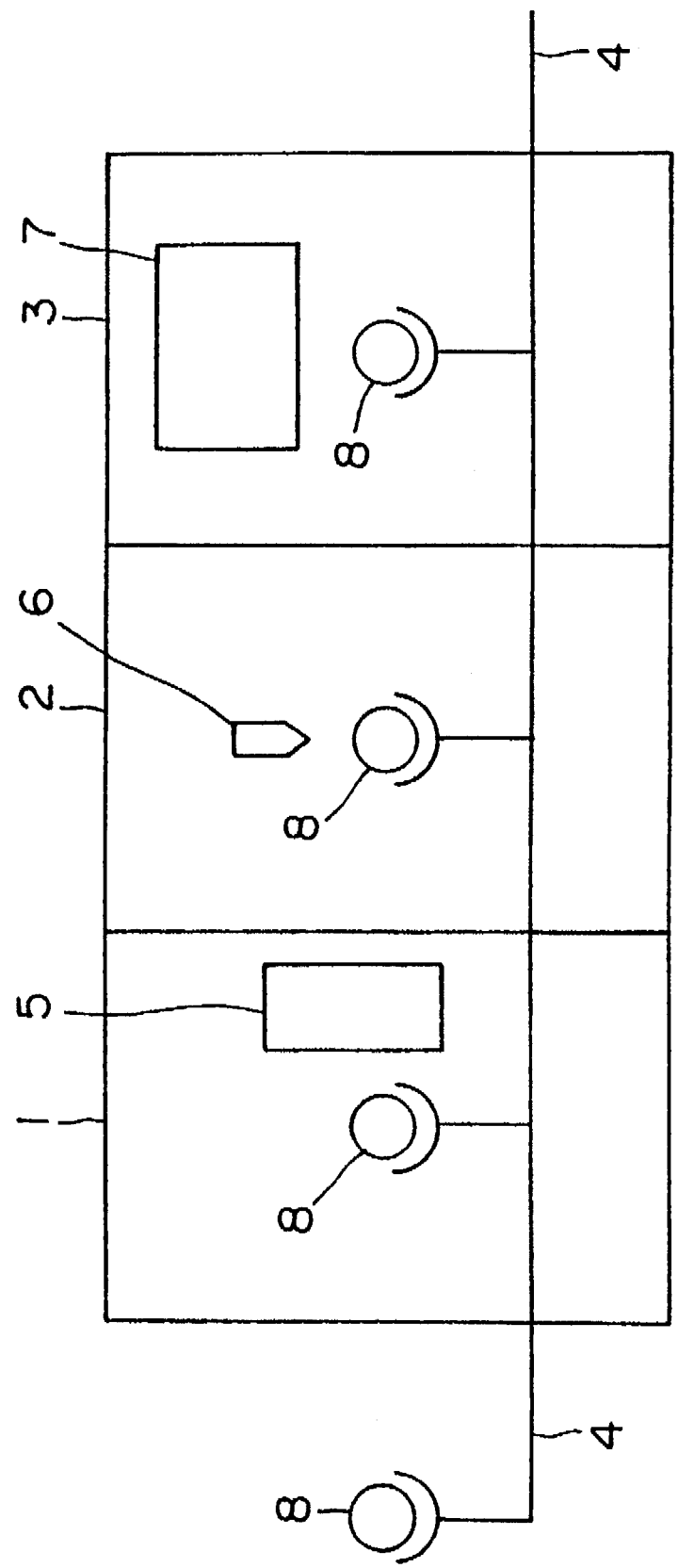

MANUFACTURING METHOD FOR MAGNETIC DISC

This application is a continuation of application Ser. No. 08/191,543 filed Feb. 4, 1994, and now abandoned.

BACKGROUND OF THE INVENTION

1. Field of the Invention

This invention relates to an apparatus and a method for manufacturing a magnetic disc used in a high-density and large-capacity recording device.

2. Description of Related Art

In general, a magnetic disc for a recording device comprises a mirror-polished disc base plate of non-magnetic material, and a magnetic recording layer which is formed on the disc base plate by a sputtering method, a deposition method or the like. When such a magnetic disc is used in a magnetic recording device adopting a CSS (Constant Start and Stop) system, the magnetic disc and a magnetic head are kept in contact with each other at the contact surfaces thereof at a non-operation time while they are slid in contact with each other at an operation start time and an operation stop time. Therefore, the contact surface of the magnetic disc suffers abrasion. In order to overcome this disadvantage, a protection film which comprises a thin film of carbon, ceramics or the like is formed on the magnetic recording layer of the magnetic disc by a sputtering method or the like, then the disc surface is subjected to a polishing treatment to lower the flying height of the magnetic head, and then a lubricant film is formed on the polished disc surface to suppress abrasion between the magnetic head and the surface of the magnetic disc and improve the durability of the magnetic disc.

Generally, the polishing treatment on the magnetic disc surface after formation of the protection film as described above is carried out as follows. That is, a polishing tape is formed by adhesively fixing abrasive particles onto a tape, and it is pressed against the surface of the rotating magnetic disc by a press roller, air pressure or the like. Further, the lubricant film is formed by a batch process in which plural magnetic discs are collectively immersed in lubricant solution for a predetermined time, and then gradually drawn out.

In the formation of the lubricant film, a curing treatment must be conducted on the lubricant in accordance with the used lubricant or based on a required performance therefor. In this case, a batch process in which plural magnetic discs provided with lubricant are collectively inserted into a heating device and heated for a predetermined time is carried out.

Here, if the lubricant amount on the disc surface is small, sufficient durability cannot be obtained for the magnetic head and the magnetic disc. On the other hand, if the lubricant amount is excessive, an adsorption phenomenon between the magnetic head and the magnetic disc occurs, and damage of the magnetic disc and the magnetic head results, and failure of disc rotation. Accordingly, adjustment in the lubricant amount and the curing treatment is required to be carried out with extremely high precision.

However, in the conventional method as described above, the heating temperature for the curing process is dispersed in the heating device, that is, there occurs a temperature distribution in the heating device in the curing process, so that any dispersion occurs in products. Further, after the curing process, a large number of discs must be stocked to wait for the next process, and thus its yield is low. Still further, there is a possibility that several hundred defective products are simultaneously obtained because of a failure in the curing treatment device, a workers mistake or the like.

A magnetic disc of higher density and larger capacity has been recently required, and the precision of the magnetic disc surface and a lubricant performance have been also required to be improved. In order to satisfy this requirement, a control method for a lubricant supply device and a curing treatment device has been proposed. Such a control method causes various problems, for example, that a more complicated control operation is required, the device price is increased, and productivity of discs is lowered. However, these problems cannot be solved by the conventional batch type of manufacturing apparatus as described above.

SUMMARY OF THE INVENTION

An object of this invention is to provide an apparatus and a method for effectively manufacturing magnetic discs having stable characteristics with high productivity.

In order to attain the above object, according to a first aspect of this invention, a magnetic disc manufacturing apparatus for successively conducting a polishing process and a lubricant supply process on a disc having a magnetic recording layer formed thereon includes a polishing device for conducting a polishing treatment on the disc having the magnetic recording layer thereon, a supply device for supplying lubricant on the disc which has been subjected to the polishing treatment, and a feeding mechanism for feeding the disc, wherein the polishing device and the supply device are successively connected to each other through the feeding mechanism, and the treatments in the polishing device and the supply device are synchronized with the feeding operation of the disc between the polishing device and the supply device.

According to a second aspect of this invention, a magnetic disc manufacturing apparatus for successively conducting a polishing process and a lubricant supply process on a disc having a magnetic recording layer formed thereon, includes a polishing device for conducting a polishing treatment on the disc having the magnetic recording layer thereon, a supply device for supplying lubricant on the disc which has been subjected to the polishing treatment, and a feeding mechanism for feeding the disc, wherein the polishing device and the supply device are successively connected to each other through the feeding mechanism, and wherein a feeding operation of the disc to the polishing device, the treatments in the polishing device and the supply device, a feeding operation of the disc between the polishing device and the supply device, and a feeding operation of the disc from the supply device to a next process are synchronized with one another.

According to a third aspect of this invention, a magnetic disc manufacturing apparatus for successively conducting a polishing process, a lubricant supply process and a curing process on a disc having a magnetic recording layer formed thereon, includes a polishing device for conducting a polishing treatment on the disc having the magnetic recording layer thereon, a supply device for supplying lubricant on the disc which has been subjected to the polishing treatment, a curing device for curing the lubricant on the disc, and a feeding mechanism for feeding the disc, wherein the polishing device, the supply device and the curing device are successively connected to one other through the feeding mechanism, and the treatments in the polishing device, the supply device and the curing device are synchronized with the feeding operation of the disc among the polishing device, the supply device and the curing device.

According to a fourth aspect of this invention, a magnetic disc manufacturing apparatus for successively conducting a polishing process, a lubricant supply process and a curing process on a disc having a magnetic recording layer formed thereon, includes a polishing device for conducting a polishing treatment on the disc having the magnetic recording layer thereon, a supply device for supplying lubricant on the disc which has been subjected to the polishing treatment, a curing device for curing the lubricant on the disc, and a feeding mechanism for feeding the disc, wherein the polishing device, the supply device and the curing device are successively connected to one other through the feeding mechanism, and a disc feeding operation to the polishing device, the treatments in the polishing device, the supply device and the curing device, a disc feeding operation among the polishing device, the supply device and the curing device, and a disc feeding operation to a next process are synchronized with one another.

In the manufacturing apparatus for the magnetic disc according to the third and fourth aspects, a radiation heat type of heating device may be used as the curing device for curing the lubricant.

According to a fifth aspect of this invention, a magnetic disc manufacturing method for successively conducting a polishing process and a lubricant supply process on a disc having a magnetic recording layer thereon, is characterized in that the polishing process and the lubricant supply process are synchronized with each other to perform a mono-line process.

According to a sixth aspect of this invention, a magnetic disc manufacturing method for successively conducting a polishing process, a lubricant supply process and a curing process on a disc having a magnetic recording layer thereon, is characterized in that the polishing process, the lubricant supply process and the curing process are synchronized with each other to perform a mono-line process.

In the fifth and sixth aspects, the curing process for the lubricant is carried out by applying radiation heat to the disc. According to the first aspect of this invention, the treatments in the polishing device for conducting the polishing process on the disc having the magnetic recording layer thereon and the supply device for supplying the lubricant to the disc which has been subjected to the polishing treatment are .synchronized with the disc feeding operation between the polishing device and the supply device. Therefore, no stock device for discs is required, and magnetic discs can be manufactured in a state where a take-out (pick-up) device and an inserting device which are located between the polishing device and the lubricant supply device can be collectively and integrally provided to the feeding device.

According to the second aspect of this invention, the feeding operation of the disc to the polishing device, the treatments in the polishing device and the supply device, and the feeding operation of the disc between the polishing device and the supply device, and the feeding operation of the disc from the supply device to a next process are synchronized with one another. Therefore, no disc stock device is required, and magnetic discs can be manufactured in a state where a take-out device and an inserting device which are located between the polishing device and the lubricant supply device can be collectively and integrally provided to the feeding device.

According to the third aspect of this invention, the treatments in the polishing device, the supply device and the curing device are synchronized with the feeding operation of the disc among the polishing device, the supply device and the curing device. Therefore, no disc stock device is required, and magnetic discs can be manufactured in a state where a take-out device and an inserting device which are located between the polishing device and the lubricant supply device can be collectively and integrally provided to the feeding device.

According to the fourth aspect of this invention, the disc feeding operation to the polishing device, the treatments in the polishing device, the supply device and the curing device, the disc feeding operation among the polishing device, the supply device and the curing device, and the disc feeding operation to a next process are synchronized with one another. Therefore, no disc stock device is required, and magnetic discs can be manufactured in a state where a take-out device and an inserting device which are located between the polishing device and the lubricant supply device can be collectively and integrally provided to the feeding device.

According to the third and fourth aspects of this invention as described above, the radiation heat type of heating device is used as the curing device for curing the lubricant, no disc stock device is required, and magnetic discs can be manufactured in a state where a take-out device and an inserting device which are located between the polishing device and the lubricant supply device can be collectively and integrally provided to the feeding device.

According to the fifth aspect of this invention, the polishing process for polishing the disc having the magnetic recording layer thereon and the lubricant supply process for supplying the lubricant onto the polished disc are synchronized with each other. Therefore, no disc stock device is required, and magnetic discs can be manufactured in a state where a take-out device and an inserting device which are located between the polishing device and the lubricant supply device can be collectively and integrally provided to the feeding device.

According to the sixth aspect of this invention, the polishing process for polishing the disc having the magnetic recording layer thereon, the lubricant supply process for supplying the lubricant onto the polished disc and the curing process for curing the lubricant on the disc are synchronized with each other. Therefore, no disc stock device is required, and magnetic discs can be manufactured in a state where a take-out device and an inserting device which are located between the polishing device and the lubricant supply device can be collectively and integrally provided to the feeding device.

BRIEF DESCRIPTION OF THE FIGURE

The FIGURE is a schematic diagram showing the construction of a magnetic disc manufacturing apparatus according to an embodiment according to this invention.

DETAILED DESCRIPTION OF THE PREFERRED EMBODIMENTS

The Figure shows is a schematic diagram showing the construction of a magnetic disc manufacturing apparatus according to the preferred embodiment according to this invention. As shown, the magnetic disc manufacturing device according to this invention includes a polishing device 1 for conducting a polishing treatment on a disc having a magnetic recording layer formed thereon, a supply device 2 for supplying lubricant onto the polished disc, a curing device 3 for curing the lubricant on the disc, which are disposed in this order, and a feeding mechanism 4 for successively feeding the disc 8 from the polishing device 1 to the curing device 3. The polishing device 1 is provided with a polishing unit 5 for conducting a polishing treatment on the disc 8 having the magnetic recording layer, the supply device 2 is provided with a lubricant dispenser 6 for supplying the lubricant to the polished disc, and the curing device 3 is provided with a infrared ray heater 7 for curing the lubricant on the disc.

Any combination of well-known devices may be used for the polishing device 1, the lubricant supply device 2 and the curing device 3 as described above. Further, a mechanism for taking out or inserting a disc from or into each device 1, 2, 3 may be added. In order to synchronize the processes in the respective devices with one another, these devices may be designed to conduct parallel treatments on plural discs.

The feeding mechanism 4 serves to feed discs one by one or feed plural discs in a lump, for example, from a stock for intermediate products to one of the devices (in this case, polishing device), between the respective devices, into each device, and from one of the devices (in this case, curing device) to a preservation stock for products. Any well-known mechanism may be used as the feeding mechanism insofar as this mechanism has a disc feeding function.

The same non-magnetic disc base plate as the conventional apparatus may be used in this embodiment. For example, it may be formed of high-purity aluminum, aluminum alloy, ceramics, hard plastic, carbon, glass or the like. Usually, an aluminum alloy base plate is used. The surface of the base plate is subjected to an alumite treatment and then a mirror-polishing treatment, or the surface of the base plate is coated with a film of Ni-P alloy, Ni-Cu-P alloy or the like by an electroless plating method or the like and then subjected to a mirror-polishing treatment. The base plate whose surface has been subjected to a hardening treatment by the electroless plating or the like is usually subjected to a well-known texture treatment. The texture treatment is defined as a surface roughening treatment for scratching the base plate substantially concentrically in a circumferential direction using a polishing tape or polishing solution.

The magnetic recording layer which is formed after the texture treatment may be formed of the same as the conventional apparatus, for example, it may be selected from a sputtering film of $\gamma$-$Fe_2O_3$, sputtering films, deposition films or plating films of Co-group, CoNiCr-group, CoPt-group, CoCrTa-group, Fe-group, etc. In order to adjust the magnetic characteristic, a Cr or Cr alloy coating may be formed as a backing layer before the magnetic recording layer is formed. A protection film of carbon or the like which is formed on the magnetic recording layer may be formed by a sputtering method, a deposition method or the like.

The polishing device 1 serves to conduct a polishing treatment on a disc on which a protection film is formed, and a roll press type of polishing device or an air pressure type of polishing device may be used. Further, a mechanism for cleaning the disc or a cleaning device may be provided.

The supply device 2 serves to supply the lubricant onto the disc after subjected to the polishing treatment, and it includes a disc rotating mechanism for supplying the lubricant onto the disc while rotating the disc.

The curing device 3 serves to conduct a curing treatment on the disc provided with the lubricant, and it irradiates heat rays, ultraviolet ray or other radiation to the lubricant on the disc. Stability of a lubricant film which is formed by the curing treatment is mainly dependent on the curing temperature, and scarcely dependent on a curing time. Accordingly, radiation heat is preferable because it can provide desired stability to the lubricant for a short time. As a source for radiation heat may be used an infrared ray lamp, a lamp heater using a halogen lamp, a resistance heating unit using a nichrome wire, a platinum wire, a tungsten wire or the like, a well-known heat radiant for generating and radiating far infrared rays or near infrared rays such as an electric hot plate, a pipe heater or the like. No curing device 3 is required in a process which requires no curing treatment on the lubricant.

Since the protection film which is formed in a vacuum process such as a sputtering method, a deposition method or the like has a chemically active surface, if the surface of the disc taken out from the protection film forming apparatus is exposed to outside air, it reacts with water or a fine amount of other components, so that the outermost surface of the disc gradually loses its activity. If the activity on the outermost surface of the magnetic disc is varied, the absorption amount of the lubricant on the disc and the chemical coupling state of the lubricant on the disc when the lubricant is supplied onto the disc are also varied. As a result, the magnetic discs having different lubricant characteristics are formed.

Since the conventional magnetic disc manufacturing apparatus adopts the batch process, a waiting time which is required from the protection film forming process in the vacuum process to the lubricant film forming process is varied in accordance with each disc. Therefore, the magnetic discs having different lubricant characteristics are formed, and thus the product characteristic is not stable.

However, in the magnetic disc manufacturing apparatus of this embodiment as described above, after the thin film is formed in the vacuum film forming device, the formation of the lubricant film is conducted at a constant time interval. Therefore, the variation of the surface state of the disc can be set to be constant over all the discs, so that the same lubricant characteristics can be obtained for all the products and the product characteristic is stable.

Further, in the magnetic disc manufacturing apparatus of this embodiment, the process speeds of the protection film forming process, the lubricant supply process and the curing process are synchronized with one another, and thus no stock device for stocking each disc between the respective neighboring processes is required. In addition, a take-out device and an inserting device of the discs between the respective devices can be collectively and integrally provided to the feeding device, and thus the construction of the whole apparatus can be miniaturized and simplified, so that probability of failure of the apparatus can be reduced and the price of the apparatus can be also lowered.

Next, the magnetic disc manufacturing method according to an embodiment of this invention will be described.

EMBODIMENT

First, a hardening treatment film of Ni-P alloy having about 10 μm thickness was formed on a non-magnetic disc base plate of aluminum alloy having 95 mm diameter by the electroless plating method, and then this film was subjected to a texture treatment. The surface roughness (Rmax) of the disc after the texture treatment was measured to be 300 Å or less. Here, Rmax represents a value obtained by averaging 20 measurement values for the difference between the highest peak and the deepest bottom at the measurement length of 0.08 mm.

Subsequently, a backing film of Cr having about 500 Å thickness was formed on the disc by a DC magnetron sputtering device under a condition: a base-plate temperature of 300° C., Ar gas pressure of 10 mTorr and DC power of 5 W/cm². Further, a bias voltage of −150 V was applied across the disc and a sputtering anode while forming a magnetic recording layer of CoCrTa, and then a carbon protection film was formed under the same condition as the protective layer.

The disc on which the carbon protection film was formed was fed to the polishing device 1 by the feeding mechanism 4, and then the disc was subjected to the polishing treatment in the polishing device 1. A roll press type of polishing device 5 was used as the polishing device 1, and a polishing tape which was obtained by adhesively fixing alumina abrasive particles having 2 μm average particle diameter onto a polyester base film was used.

The disc which was polished in the polishing device 1 was fed from the polishing device 1 to the supply device 2 by the feeding mechanism 4. During this feeding operation, the next disc was fed to the polishing device 1. In the supply device 2, the disc was mounted in the disc rotating mechanism, and lubricant was supplied onto the disc by a lubricant dispenser 6 using a spin coat method.

After subjected to the lubricant supply treatment, the disc was fed from the supply device 2 to the curing device 3 by the feeding mechanism 4, and subjected to the curing treatment by an infrared ray heater 7. The cured disc was fed to a disc testing device (not shown) located at the outside of the apparatus of this invention by the feeding mechanism 4.

The treatment time of each respective devices was set to 11 seconds and the disc feeding time was set to 5 seconds so that these treatments and the feeding operation were synchronized with one other. Therefore, the magnetic discs were successively treated one by one at 16-second interval totally.

COMPARATIVE EXAMPLE

The disc which was obtained by the same method as this embodiment was subjected to the surface polishing treatment, the lubricant supply treatment and the curing treatment by the batch process. That is, the disc after the protection film was formed was subjected to the surface polishing treatment by the same device as this embodiment after three hours elapsed. After three hours further elapsed, lubricant was supplied to every 50 discs at a time by a dipping method. After three hours further elapsed, every 200 discs were subjected to the curing treatment using an oven at a time.

In this embodiment and the comparative example, every 25 sample discs after the last process were picked up and then the lubricant film thickness, the lubricant film survival rate, CSS durability and the head adsorption characteristic were measured for these samples. The lubricant film thickness was measured by an ESCA. The lubricant film survival rate was measured by conducting an ultrasonic cleaning with lubricant solution for three minutes and then measuring the lubricant film thickness with the ESCA to obtain the rate of the residual lubricant film to an initial thickness. The product stability is more stable as the dispersion in the lubricant film thickness and the lubricant film survival rate is reduced.

The CSS durability was measured as follows. That is, the disc was set to a rotational spindle, and a thin film magnetic head was disposed at a position away from the center by 20 mm in the radial direction of the disc. Thereafter, the CSS process in which the rotational speed of the magnetic disc was varied from 0 rpm through 3600 rpm to 0 rpm was periodically carried at a time interval of 30 seconds to measure the frequency of the CSS process until the friction coefficient exceeds 0.7. Here, the flying amount of the magnetic head was set to 0.13 μm. The 0 rpm rotational speed of the disc corresponds to a state where the magnetic head is contacted with the surface of the disc, and the 3600 rpm rotational speed corresponds to a state where the magnetic head is flied from the surface of the disc. Here, a used thin-film magnetic head had a slider which was formed of $Al_2O_3$·TiC and 3.20 mm in length, 2.66 mm in width and 7.2 gram-weight. The CSS durability is more excellent as the process frequency is increased, however, sufficient CSS durability can be obtained insofar as the process frequency is 100,000 or more.

The head adsorption characteristic is defined as the maximum statical friction coefficient. The statical friction coefficient was measured as follows. The thin-film magnetic head as described above was contacted with the surface of the disc, and it was left for 48 hours under a condition: temperature of 30° C. and humidity of 80%RH. Thereafter, the disc was rotated to measure the maximum statical friction coefficient. If the friction coefficient is below 0.3, adsorption force between the protection film and the lubricant film would be sufficient and thus the head adsorption characteristic would be excellent. Usually, the CSS durability and the head adsorption characteristic are in reciprocal relation with each other. The result of the embodiment and the comparative example are shown in the following table 1.

TABLE 1

| | LUBRICANT FILM THICKNESS (A) | LUBRICANT FILM SURVIVAL RATE (%) |
|---|---|---|
| (E) | 21–23 | 49–52 |
| (CE) | 21–25 | 44–58 |

| | CSS DURABILITY (FREQUENCY) | HEAD ADSORPTION CHARACTERISTIC (FRICTION COEFFICIENT) |
|---|---|---|
| (E) | 150,000–200,000 | 0.18–0.22 |
| (CE) | 80,000–250,000 | 0.18–2.66 |

(E): EMBODIMENT, (CE): COMPARATIVE EXAMPLE

As described above, according to the magnetic disc manufacturing method of this embodiment, the protection film is formed on the disc base plate by the sputtering method or the like, and the disc is subjected to the surface polishing treatment, the lubricant supply treatment and the lubricant curing treatment. Through these treatments, variation of the surface state of discs is controlled to be constant, whereby the lubricant film thickness, the lubricant film survival rate, the CSS durability and the head adsorption characteristic are stabilized to excellent values.

As described above, the magnetic disc manufacturing apparatus of this invention are provided with at least the polishing device for polishing a disc and the supply device for supplying the lubricant onto the polished disc, and the polishing device and the supply device are controlled to conduct their treatments in synchronism with each other. Therefore, no stock device for discs are required, and the take-out device and the inserting device for the discs from and into the respective devices can be collectively and integrally built in the feeding mechanism, whereby the whole apparatus can be miniaturized. Further, the respective treatments can be conducted at predetermined time intervals, and the variation of the surface state is controlled to be constant over all discs, thereby obtaining products having stable characteristics.

As described above, the magnetic disc manufacturing method of this invention includes at least the polishing process for conducting the polishing treatment on a disc and the lubricant supply process for supplying the lubricant onto the polished disc, and the polishing process and the lubricant supply process are controlled to be conducted in synchronism with each other. Therefore, the variation of the surface state of the disc is controlled to be constant over all discs, thereby manufacturing magnetic discs having stable characteristics with high productivity.

What is claimed is:

1. A method of fabricating a plurality of magnetic discs of corresponding quality from a plurality of workpieces which each comprise a disc base plate, a layer of magnetic material on the disc base plate and a protective layer on the layer of magnetic material, said method comprising the steps of:
   (a) providing a plurality of disc base plates each having a layer of magnetic material thereon;
   (b) providing a protective layer forming means capable of forming a protective layer on the layer of magnetic material of each of said plurality of disc base plates to form a plurality of workpieces;
   (c) providing means capable of polishing an exposed surface of a protective layer of a workpiece, to form a _polished surface on a workpiece;
   (d) providing a lubricant dispensing means for applying lubricant to a polished surface of a workpiece;
   (e) providing a conveyor mechanism which moves in a path adjacent said protective layer forming means, then adjacent said polishing means, and then adjacent said lubricant dispensing means;
   (f) sequentially positioning said plurality of disc base plates one at a time on said conveyor mechanism;
   (g) forming a protective layer on a first of said plurality of disc base plates with said protective layer forming means to form a first workpiece; then
   (h) polishing the protective layer of said first workpiece with said polishing means at the end of a time interval of a fixed duration beginning immediately after formation of said first workpiece to form a polished surface of said first workpiece, and synchronously forming a protective layer on a second of said plurality of disc base plates with said protective layer forming means to form a second workpiece; then
   (i) coating said polished surface of said first workpiece with lubricant applied by said lubricant dispensing means at the end of a time interval of said fixed duration beginning immediately after polishing the protective layer of said first workpiece, and synchronously polishing the protective layer of said second workpiece with said polishing means to form a polished surface of said second workpiece; and then
   (j) coating the polished surface of said second workpiece with lubricant applied by said lubricant dispensing means at the end of a time interval of said fixed duration beginning immediately after polishing the protective layer of said second workpiece.

2. A method as in claim 1, further including the steps of providing a heating means and curing, with said heating means, lubricant applied to the polished surfaces of said first and subsequent workpieces.

3. A method as in claim 2, wherein the path of said conveyor mechanism moves adjacent said heating means after moving adjacent said lubricant dispensing means.

4. A method as in claim 1, wherein step (i) further comprises synchronously forming a protective layer with said protective layer forming means on a third of said plurality of disc base plates to form a third workpiece.

5. A method as in claim 4, wherein said fixed time interval in step (h) and said fixed time interval in step (i) are of the same duration.

6. A method as in claim 5, wherein said steps of forming a protective layer, polishing and lubricating are performed sequentially on each subsequent disc base plate of said plurality of disc base plates, and the time period between performing each step on each subsequent disc base plate is the fixed time interval, and said steps are performed synchronously on different ones of said subsequent disc base plates such that at the same time one of said subsequent disc base plates is lubricated another one of said subsequent disc base plates is polished and yet another one of said subsequent disc base plates has a protective layer formed thereon.

7. A method of providing consistent lubricating properties throughout a batch lot of fabricated magnetic discs which each comprise a disc base plate, a layer of magnetic material on the disc base plate and a protective layer on the layer of magnetic material, said method comprising the steps of:
   (a) providing a plurality of disc base plates each having a layer of magnetic material thereon;
   (b) providing a protective layer forming means capable of forming a protective layer on the layer of magnetic material of each of said plurality of disc base plates to form a plurality of workpiece;
   (c) providing a polishing means capable of polishing an exposed surface of a protective layer of a workpiece, to form a polished surface on a workpiece;
   (d) providing a lubricant dispensing means for applying lubricant to a polished surface of a workpiece;
   (e) providing a conveyor mechanism which moves in a path adjacent said protective layer forming means, then adjacent said polishing means, and then adjacent said lubricant dispensing means;
   (f) sequentially positioning said plurality of disc base plates one at a time on said conveyor mechanism;
   (g) forming a protective layer on a first of said plurality of disc base plates with said protective layer forming means to form a first workpiece; then
   (h) polishing the protective layer of said first workpiece with said polishing means at the end of a time interval of a fixed duration beginning immediately after formation of said first workpiece to form a polished surface of said first workpiece, and synchronously forming a protective layer on a second of said plurality of disc base plates with said protective layer forming means to form a second workpiece; then
   (i) coating said polished surface of said first workpiece with lubricant applied by said lubricant dispensing means at the end of a time interval of said fixed duration beginning immediately after polishing the protective layer of said first workpiece, and synchronously polishing the protective layer of said second workpiece with said polishing means to form a polished surface of said second workpiece; and then
   (j) coating the polished surface of said second workpiece with lubricant applied by said lubricant dispensing means at the end of a time interval of said fixed duration beginning immediately after polishing the protective layer of said second workpiece.

8. A method as in claim 7, further including the steps of providing a heating means and curing, with said heating means, lubricant applied to the polished surfaces of said first and subsequent workpieces.

9. A method as in claim 8, wherein the path of said conveyor mechanism moves adjacent said heating means after moving adjacent said lubricant dispensing means.

10. A method as in claim 7, wherein step (i) further comprises synchronously forming a protective layer with said protective layer forming means on a third of said plurality of disc base plates to form a third workpiece.

11. A method as in claim 10, wherein said fixed time interval in step (h) and said fixed time interval in step (i) are of the same duration.

12. A method as in claim 11, wherein said steps of forming a protective layer, polishing and lubricating are performed sequentially on each subsequent disc base plate of said plurality of disc base plates, and the time period between performing each step on each subsequent disc base plate is the fixed time interval, and said steps are performed synchronously on different ones of said subsequent disc base plates such that at the same time one of said subsequent disc base plates is lubricated another one of said subsequent disc base plates is polished and yet another one of said subsequent disc base plates has a protective layer formed thereon.

13. A method of fabricating a plurality of magnetic discs of corresponding quality from a plurality of workpieces which each comprise a disc base plate, a layer of magnetic material on the disc base plate and a protective layer on the layer of magnetic material, said method comprising the steps of:

(a) providing a plurality of disc base plates each having a layer of magnetic material thereon;

(b) providing a protective layer forming means capable of forming a protective layer on the layer of magnetic material of each of said plurality of disc base plates to form a plurality of workpieces;

(c) providing a polishing means capable of polishing an exposed surface of a protective layer of a workpiece, to form a polished surface on a workpiece;

(d) providing a lubricant dispensing means for applying lubricant to a polished surface of a workpiece;

(e) providing a conveyor mechanism which moves in a path adjacent said protective layer forming means, then adjacent said polishing means, and then adjacent said lubricant dispensing means;

(f) sequentially positioning said plurality of disc base plates one at a time on said conveyor mechanism;

(g) forming a protective layer on a first of said plurality of disc base plates with said protective layer forming means to form a first workpiece;

(h) polishing the protective layer of said first workpiece with said polishing means at the end of a time interval of a fixed duration beginning immediately after formation of said first workpiece to form a polished surface of said first workpiece;

(i) forming a protective layer on a second of said plurality of disc base plates with said protective layer forming means to form a second workpiece;

(j) coating said polished surface of said first workpiece with lubricant applied by said lubricant dispensing means at the end of a time interval of said fixed duration beginning immediately after polishing the protective layer of said first workpiece;

(k) polishing the protective layer of said second workpiece with said polishing means to form a polished surface of said second workpiece;

(l) coating the polished surface of said second workpiece with lubricant applied by said lubricant dispensing means at the end of a predetermined fixed time interval of said fixed duration beginning immediately after polishing the protective layer of said second workpiece; and (m) synchronizing said forming, polishing, and coating steps of said first and second workpieces according to a time interval of fixed duration.

* * * * *